(No Model.)  E. C. HALL.  3 Sheets—Sheet 1.
WATER HEATER.

No. 524,897.  Patented Aug. 21, 1894.

WITNESSES.
Matthew M. Blunt.
J. Murphy.

INVENTOR.
Elijah C. Hall
by Jas. H. Churchill
Atty.

THE NORRIS PETERS CO., PHOTO-LITHO., WASHINGTON, D. C.

(No Model.) 3 Sheets—Sheet 2.

E. C. HALL.
WATER HEATER.

No. 524,897. Patented Aug. 21, 1894.

WITNESSES.
Matthew M. Blunt.
J. Murphy.

INVENTOR.
Elijah C. Hall
by Jas. H. Churchill
Atty.

(No Model.)  3 Sheets—Sheet 3.

E. C. HALL.
WATER HEATER.

No. 524,897.  Patented Aug. 21, 1894.

WITNESSES.
Matthew M. Blunt.
J. Murphy.

INVENTOR.
Elijah C. Hall
By Jas. H. Churchill
Atty.

UNITED STATES PATENT OFFICE.

ELIJAH C. HALL, OF SOUTH BRAINTREE, MASSACHUSETTS.

WATER-HEATER.

SPECIFICATION forming part of Letters Patent No. 524,897, dated August 21, 1894.

Application filed May 8, 1894. Serial No. 510,476. (No model.)

*To all whom it may concern:*

Be it known that I, ELIJAH C. HALL, residing in South Braintree, in the county of Norfolk and State of Massachusetts, have invented an Improvement in Water-Heaters, of which the following description, in connection with the accompanying drawings, is a specification, like letters and figures on the drawings representing like parts.

This invention relates to a water heater, and has for its object to improve and simplify the construction of the same, whereby a compact, efficient and economic heater may be obtained.

One feature of this invention consists in constructing the heater as will be described, so that the water to be heated is exposed to a maximum amount of heat in a substantially small heater, and this result is accomplished by constructing the walls of the fire pot as a hollow casing having inwardly projecting arms and supporting on said arms a hollow structure constituting the main portion of the heater, which structure is thereby located above the fire pot within the inner circumference or walls of the same, so that the hollow structure is situated above the hottest part of the fire pot and is surrounded by the gases and products of combustion, thereby exposing the water in said hollow structure to a maximum heat.

Another feature of the invention consists in a novel construction of the walls of the fire pot, whereby an increased heating surface is obtained, as will be described.

These and other features of this invention will be pointed out in the claims at the end of this specification.

Figure 1:
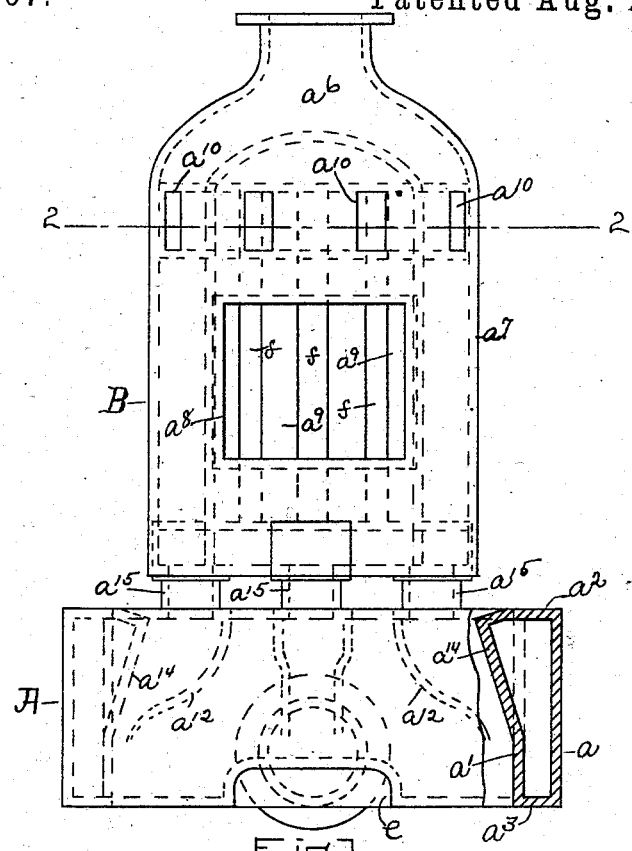
Figure 2:
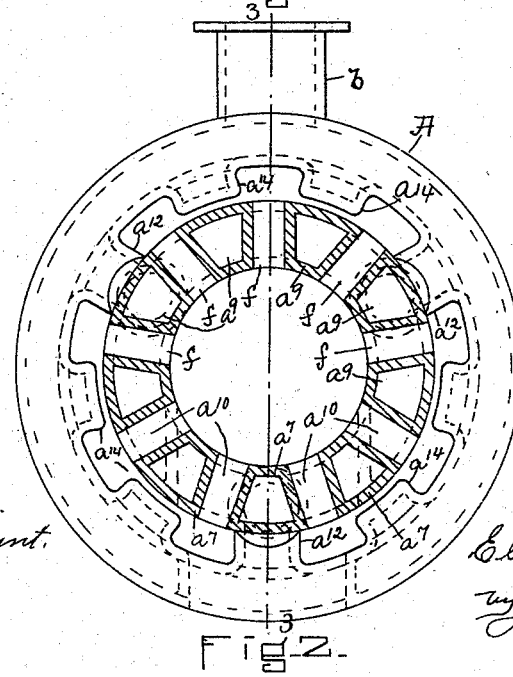
Figure 3:
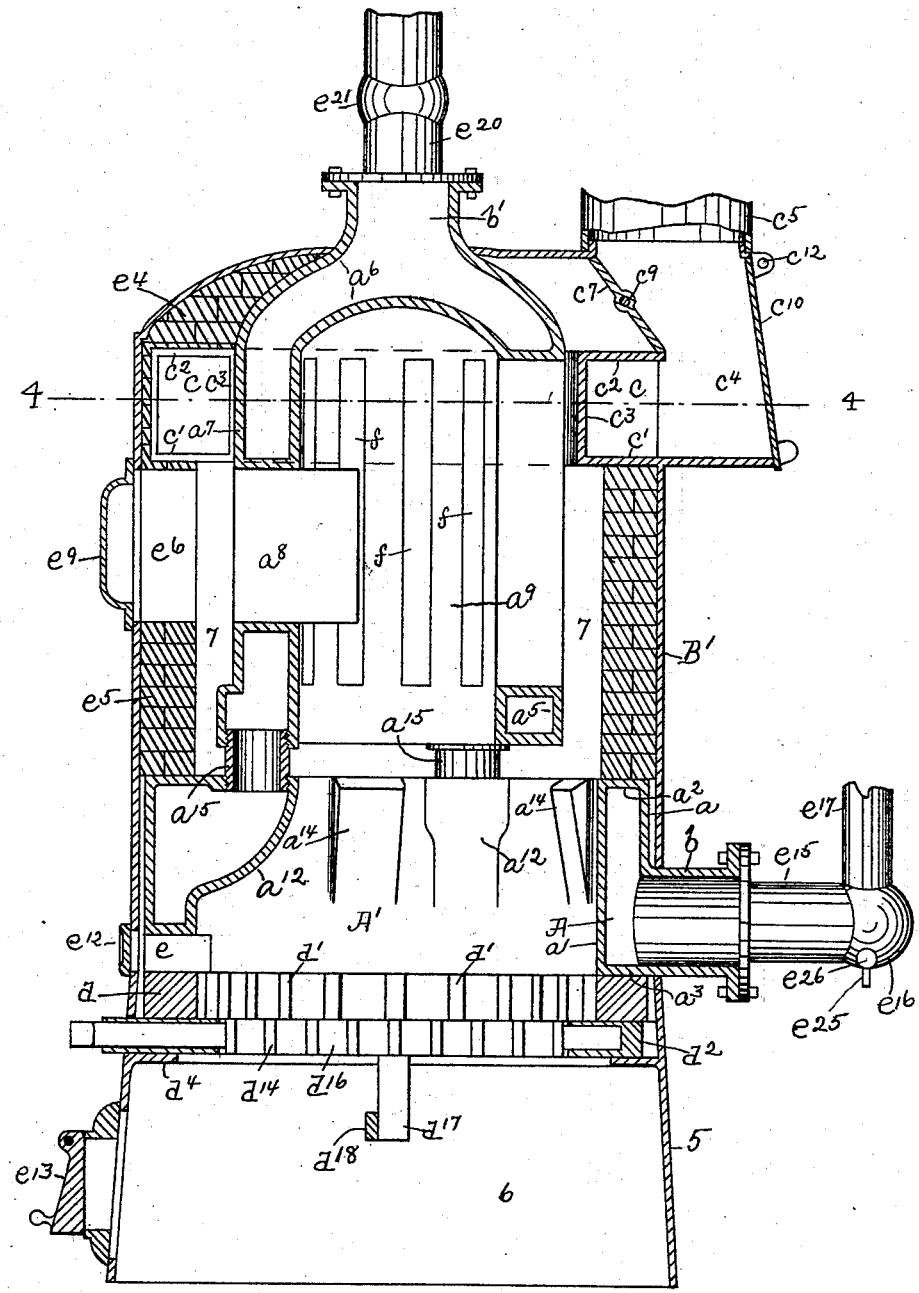
Figure 4:
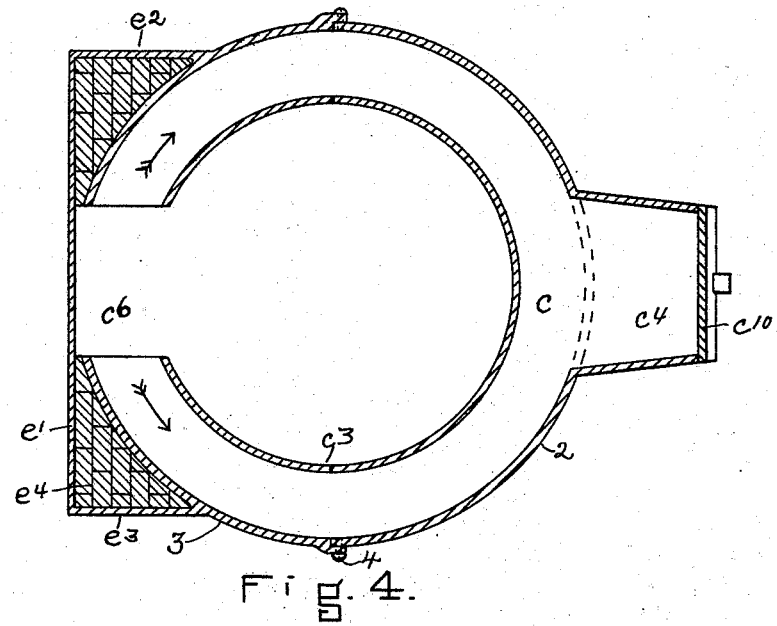

Figure 1, is a front elevation partially broken out, of the fire pot walls and the columns of a heater embodying this invention; Fig. 2, a transverse section on the line 2—2, Fig. 1; Fig. 3, a vertical section of the complete heater on the line 3—3, Fig. 2; Fig. 4, a sectional detail to show the indirect draft, the section being taken on the line 4—4, Fig. 3, and Fig. 5, a top or plan view of the form of grate preferred by me.

Referring to Fig. 1, A represents a hollow casing preferably of cylindrical shape, but which may be square or of any desired form, the said casing forming the walls of the fire pot or combustion chamber A' of the heater. The hollow casing A is composed of an outer vertical wall $a$, an inner vertical wall $a'$ and connecting top and bottom walls $a^2$ $a^3$.

In accordance with this invention, the hollow casing A has communicating with it, a water containing structure B preferably circular in form and smaller in diameter or cross section than the casing A, the said structure being supported above but within the inner walls of the casing A, for a purpose as will be described. This water containing structure consists essentially of three parts, viz:— a hollow base $a^5$ (see Fig. 3) preferably cylindrical in form, a substantially circular dome $a^6$, and an intermediate hollow body portion preferably made as herein-shown, the front part or half $a^7$ of the said body portion being made as one piece with a substantially large opening $a^8$ forming the fuel inlet for the fire pot, and the rear half or part of the said body portion being composed of a plurality of hollow columns $a^9$. The front half or part $a^7$ of the said body portion is provided above the fuel inlet opening $a^8$ with one or more ports or openings $a^{10}$, which extend entirely through the body portion, for a purpose as will be described.

The structure B is supported above and within the casing A preferably by means of a plurality of inwardly projecting hollow arms $a^{12}$, herein shown as three in number (see Fig. 2) and cast integral with the casing A, the said arms forming part of the inner wall $a'$ of said casing as shown in Fig. 3. In the present instance, the base $a^5$ is connected to the arms $a^{12}$ by hollow nipples or pipe connections $a^{15}$, which may be provided at their opposite ends with right and left screw threads to engage like screw-threaded openings in the bottom of the base $a^5$ and in the top of the arms $a^{12}$, as clearly shown in Fig. 3. These arms $a^{12}$ are made substantially large and radiate or extend toward the center of the fire pot, so as to present a substantially large surface to the direct action of the hottest portion of the fire pot, and to obtain a further increased heating surface, I prefer to cast the inner wall $a'$ of the casing A with additional smaller inwardly projecting portions or hollow ribs $a^{14}$ (see Figs. 1 and 2), and these hollow ribs may be distributed about the inner wall $a'$ in any desired number after the manner shown in Fig. 2. The casing A is provided with a suitable inlet mouth $b$ and the hollow dome $a^6$ is provided with a suitable outlet mouth $b'$.

The hollow casing A and the hollow structure B are inclosed within a suitable outside jacket or shell B', which in practice may and preferably will be made in two parts 2, 3, as represented in Fig. 4, which may be fastened together by screws 4 or in other suitable manner, and for the best results, the shell B' is enlarged or made of greater diameter at its lower part as at 5, to form a substantially wide ashpit 6 (see Fig. 3). The shell B' is made of sufficiently large diameter to leave a space 7 around and outside of the water containing structure B, and at its upper end the shell B' is provided with a substantially annular passage $c$, formed by the walls $c'$, $c^2$, $c^3$ (see Fig. 3) secured to or forming part of the said shell, the said shell forming the fourth wall of the passage $c$. The annular passage $c$ communicates at the rear side of the heater with a passage $c^4$ leading to the pipe $c^5$ connected with the flue or chimney not shown, and at the front of the heater, the passage $c$ terminates substantially above the opening $a^8$ for the fire pot, thus leaving a space or opening $c^6$ (see Fig. 4) which communicates with the space 7 and also with the space within the water containing structure B. The passage $c$ forms the indirect draft, channel or passage, which affords an outlet for the products of combustion, when the direct draft or outlet from the space 7 to the flue $c^5$ is closed by the damper $c^7$, as shown in Fig. 3. The damper $c^7$ may be of any desired or suitable construction, and is shown as fast on a rod $c^9$ operated from outside the heater. The passage $c^4$ is provided with a door $c^{10}$ hinged at its upper end as at $c^{12}$ and adapted to be opened to regulate the draft.

Figure 5:
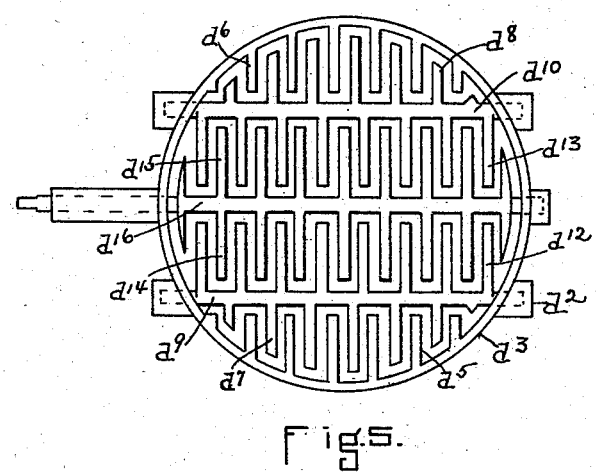

In the present instance, the hollow casing A is shown as resting upon a ring $d$ of metal preferably provided with ribs $d'$ on its inner circumference, and the ring $d$ is represented as resting directly upon lugs or ears $d^2$ of a ring $d^3$ forming part of the grate in the fire pot, the lugs $d^2$ being shown as supported by an annular flange $d^4$ on the inner side of the lower portion of the shell B'. The grate for the fire box is preferably made as shown in Fig. 5, it consisting of the annular ring $d^3$ provided with inwardly projecting arms or fingers $d^5$ $d^6$ between which extend fingers $d^7$ $d^8$ on bars $d^9$ $d^{10}$ suitably journaled in the lugs or ears $d^2$. The bars $d^9$ $d^{10}$ have extended from their other side fingers $d^{12}$ $d^{13}$, which cooperate with and extend between fingers $d^{14}$ $d^{15}$ on a central bar $d^{16}$ having bearings in the lugs $d^2$, and one end of the central bar $d^{16}$ is extended to the outside of the heater, where it may be engaged by a suitable key or crank when it is desired to shake the grate. Each bar $d^9$, $d^{10}$, $d^{16}$ is provided on its under side with a depending lug $d^{17}$, only one of which is shown in Fig. 3, the said lugs being joined together by a connecting rod or bar $d^{18}$, whereby the rocking motion imparted to the central bar $d^{16}$ will be transmitted to the bars $d^9$, $d^{10}$ by the link $d^{18}$, and all three sections of the grate surface will be moved to thereby more thoroughly dislodge the ashes. The hollow casing A is preferably cast to leave an opening $e$ (see Figs. 1 and 3) by which access may be had to the fire pot above the grate, to permit the removal of clinkers.

The outside jacket or shell B' preferably has cast integral with it a front piece $e'$ connected to the shell B' by the side pieces $e^2$ $e^3$, and the substantially triangular spaces formed by the front plate $e$, side plates $e^2$ $e^3$, and the shell B' and shown in Fig. 4, are preferably filled with fire brick or other refractory material $e^4$. Furthermore, the shell B' above the casing A is also preferably protected by a lining $e^5$ of fire brick or other refractory material, an opening $e^6$ being left in the lining $e^5$ substantially in line with the fuel inlet $a^8$, the opening $e^6$ being normally closed by a door $e^9$. The clinker opening $e$ and the opening $e^{10}$ in the ash-pit are also normally closed by suitable doors $e^{12}$ $e^{13}$ respectively.

The water inlet $b$ for the hollow casing A has connected to it a pipe $e^{15}$ forming part of a T $e^{16}$ to which may be connected the return pipes $e^{17}$ for the heater, and in practice, there may be any desired number of return pipes according to the capacity of the heater and the number of branches to be connected thereto.

The outlet $b'$ for the dome $a^6$ has connected to it a pipe $e^{20}$ preferably also forming part of a T $e^{21}$ to which the delivery pipes of the system are connected and which pipes are not herein shown.

The operation of my improved heater may be briefly explained as follows:—The heater and the system of pipes connected therewith are filled with water, which may be accomplished by connecting a suitable faucet $e^{15}$, represented as leading from the T $e^{16}$, with a street main or other suitable source of supply, and after the heater and its system of pipes have been filled with water, the supply may be shut off by means of a cock or valve $e^{26}$. The fire is started in the fire pot, and the products of combustion pass upward within and outside of the hollow water containing structure B, the products which pass within the hollow structure being permitted to escape into the space 7 through the passageways or openings $f$ between the columns, and from the space 7, the products of combustion pass directly to the outlet pipe $c^5$, the damper $c^7$ being at such time open. It will be noticed that the water in the hollow casing A is exposed to the heat of the fire pot, and by reason of the inwardly projecting arms $a^{12}$ supporting the hollow structure B above but within the diameter of the fire pot, the water contained in the hollow base $a^5$, and the upright columns $a^9$ are exposed on all sides to the action of the heat, so that the said hollow base $a^5$ and columns $a^9$ are practically surrounded by flame, by which means a maximum heating effect is obtained in a substantially small heater. After the smoke and gases have been burned off from the fuel, the damper $c^7$ may be closed, that is, turned into the position represented in Fig. 3, and in this case, the products of combustion from within the hollow structure B are permitted to pass through the openings $a^{10}$ into the passage $c^6$, and the products of combustion in the space 7 are also permitted to pass into the space 6, from whence the current or draft divides and passes through the passage $c$ in the direction indicated by arrows in Fig. 4, until the currents of heat are re-united in the passageway $c^4$, from whence they pass to the outlet pipe $c^5$. By means of the inwardly projecting arms $a^{12}$ being made of considerable size, a substantially large or increased heating surface is exposed to the direct action of the hottest part of the fire in the fire pot, which assists to more quickly heat the water, and furthermore by making the inwardly projecting ribs $a^{14}$ on the inner circumference of the casing A, a still further increased heating surface is obtained. The heated water rises from the hollow casing A, passes through the nipples or pipe connections $a^{15}$ into the hollow base $a^5$, from whence it passes up through the columns into the dome $a^6$, and from thence out through the system of delivery pipes, through the various radiators connected with the system, and returns by the pipes $e^{17}$ into the hollow casing A.

By supporting the hollow structure B upon the inwardly projecting arms $a^{12}$, the said hollow structure is brought substantially toward the center of the fire pot and is thereby exposed to the greatest heat, which results in a maximum heating effect with a minimum amount of fuel.

I claim—

1. In a water heater, the combination with a hollow casing forming the walls of a fire pot and provided with inwardly projecting hollow arms, of a hollow water containing structure supported above the said fire pot upon the said arms and comprising a hollow base, a hollow top or dome, and an intermediate body portion having openings through which the heat from the fire pot may pass to the outer side of the said body portion, the said hollow structure communicating with the said hollow casing for the circulation of the water, substantially as described.

2. In a water heater, the combination with the hollow casing A provided with the substantially large inwardly projecting hollow arms and with smaller inwardly projecting hollow ribs, of a hollow water containing structure B comprising a hollow base $a^5$, dome $a^6$ and body portion intermediate of the said dome and base, and means to connect the hollow base to the said hollow arms, substantially as described.

3. In a water heater, a hollow casing provided with inwardly projecting arms $a^{12}$, a hollow base supported by and communicating with said arms, hollow columns erected on said hollow base, a hollow dome with which said columns communicate, an inclosing shell or jacket surrounding the said columns to leave a passage 7, and passage $c$ for the indirect draft having its walls secured to the said shell or jacket, substantially as described.

4. In a water heater, a hollow casing provided with substantially large inwardly projecting hollow arms, and forming the fire pot of the heater, a hollow water containing structure supported upon the said arms and of less diameter than the diameter of the inner wall of the said hollow casing to permit the water containing structure to be surrounded by heat, substantially as described.

5. In a water heater, a hollow casing A provided with substantially large inwardly projecting hollow arms $a^{12}$ and with smaller inwardly projecting ribs, a hollow structure supported on the arms $a^{12}$ and comprising a hollow base $a^5$, dome $a^6$ and intermediate hollow body portion having its front provided with a fuel inlet opening and with ports or openings $a^{10}$ above the fuel inlet opening, and having its rear portion composed of hollow columns, substantially as described.

In testimony whereof I have signed my name to this specification in the presence of two subscribing witnesses.

ELIJAH C. HALL.

Witnesses:
JAS. H. CHURCHILL,
J. MURPHY.